Dec. 23, 1952     W. V. DAUGHERTY     2,622,464
PIVOTED HAND TOOL
Filed Dec. 7, 1951
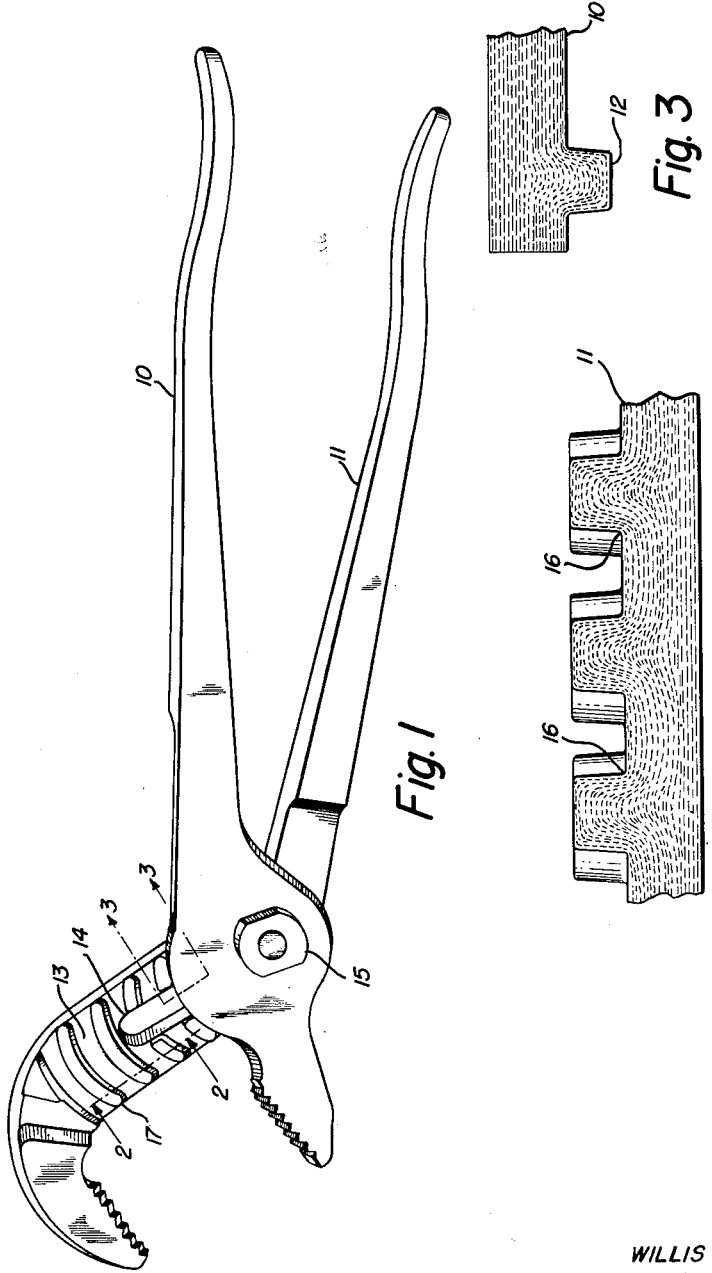
INVENTOR.
WILLIS V. DAUGHERTY
BY Woodling and Krost
attys Patented Dec. 23, 1952

2,622,464

UNITED STATES PATENT OFFICE 2,622,464

PIVOTED HAND TOOL

Willis V. Daugherty, Clinton, N. Y., assignor to Utica Drop Forge & Tool Corporation, a corporation of New York Application December 7, 1951, Serial No. 260,418

5 Claims. (Cl. 81—51.3)

This invention relates to hand tools in general, and relates specifically to pivoted hand tools.

An object of this invention is to provide pivot means acting between two pivoted levers, which pivot means is greatly improved in strength characteristics.

Another object of the invention is to provide tongue and groove pivot means having the grain structure intact and compacted at the stress points.

Still another object of the invention is to provide an improved wear resistant surface for the coacting members of adjustable hand tools.

Yet another object of the invention is to provide shock absorbing tongue and groove pivot means for a pivoted hand tool.

Other objects and a fuller understanding of the invention may be had by referring to the following description and claims taken in conjunction with the accompanying drawings, in which:

Figure 1 is a plan view of a pivoted hand tool which may be made according to the teachings of this invention;

Figure 2 is a greatly enlarged section taken along line 2—2 of Figure 1, and with illustrative grain flow lines sketched in to show the grain structure; and Figure 3 is a section taken along line 3—3 of Figure 1 showing the tongue of one lever member which is adapted to slide in one groove in the other lever member.

The drawing illustrates the physical form of a hand tool which may be made by the teachings of the present invention. This type of tool has been available for many years on the open market. This tool comprises two lever members 10 and 11 having a tongue and groove type of pivot means therebetween. Lever 10 is provided with one semicircular tongue 12 thereon, whereas lever 11 is provided with a series of grooves 13 therein. One such groove only will be required for nonadjustable pliers. Lever member 11 is slotted, as indicated by the reference character 14, in the pivot area. A bolt and nut assembly 15 extends through the levers 10 and 11 and prevents the lever members from separating in the pivot area. The bolt and nut assembly does not serve as a pivot, because the pivoting function is provided by the intermeshing of tongue 12 into one of the selected grooves 13.

Prior to this invention, all pliers of this type have been made by forging the handle piece 16 in the pivot area and machining out the grooves 13. When this is done, of course, the fibers of the forging—that is, the grain flow—are cut across by the machining process and a loss of strength results.

The concept of forging grooves in a tool of this type was conceived, and after having actually been accomplished, it was found that the grain structure not only was interrupted, but was highly compressed at the area joining the side walls of the grooves and the bottom walls thereof. This area is indicated by the reference character 16. An examination of the prior art tools of a comparable nature will reveal that the grooves are machined into the pivot area with practically square bottom corners. These corners set up what are known metallurgically as stress risers, which cause an inherent weakness and tendency to crack at the bottom of these grooves, especially when the part has to be heat treated, as these parts do have to be.

Not only has the process of this invention eliminated the conventional cut grain structure, but the grain structure has actually been compacted at the very place stress risers normally are set up, thus resulting in an exceptionally great increase in strength.

Furthermore, it has been found that by forging the tongue and groove structure in the pivot area without any machining of the surface, whatsoever, and finishing the surface only by sand blasting, picking, or similar processes to loosen the flaky scale, results in a surface of highly oxidized metal which is extremely hard and wear resistant but, nevertheless, provides a surface which allows the mating tongue and groove parts to slide with unusual ease. Attention is directed to the rounded ends 17 of each land area between the grooves 13. This improved rounded end construction aids the tongue 12 to "find" its groove 13 easily.

Finally, when forged with a slight taper, the mating tongue and groove structure tends to force the levers 10 and 11 apart when a great force is placed upon the handles in gripping a workpiece. Such forcing of the levers apart causes a binding action on the bolt and nut assembly 15 which aids in holding the workpiece in a tight grip for a prolonged period of time. A workman can place more initial force upon the levers than he can maintain for a long period of time. The wedging action aids somewhat in holding the workpiece over an extended period of time.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pivoted tool comprising, first and second lever members, tongue and groove pivot means between said first and second lever members, and clamp means holding said lever members engaged for pivotal interconnection, said pivot means comprising a series of semicircular grooves with land areas therebetween in said first lever member, said first lever and the grooves therein being constructed of one integral piece with the grain flow of the lever running longitudinally thereof and looping down under the grooves and up into the land areas separating the grooves, and semicircular tongue means carried by said second lever fitting in sliding manner into selected grooves in said first lever, said second lever and the tongue means being constructed of one integral piece with the grain flow of the lever running longitudinally thereof and looping up into the tongue means.

2. A pivoted tool comprising, first and second lever members, tongue and groove pivot means between said first and second lever members, and clamp means holding said lever members engaged for pivotal interconnection, said pivot means comprising at least one semicircular groove in said first lever member, said first lever member and the groove therein being constructed of one integral piece with the grain flow of the lever running longitudinally thereof and looping down under the groove and upward into the area around the groove, and semicircular tongue means carried by said second lever fitting in sliding manner into said groove in said first lever, said second lever and the tongue means being constructed of one integral piece with the grain flow of the lever running longitudinally thereof and looping up into the tongue means.

3. A pivoted tool comprising, first and second lever members, tongue and groove pivot means between said first and second lever members, and clamp means holding said lever members engaged for pivotal interconnection, said pivot means comprising at least one semicircular groove in said first lever member, said first lever member and the groove therein being constructed of one integral piece with the side walls thereof tapered not more than five degrees and the grain flow of the lever running longitudinally thereof and looping down under the groove and upward into the area around the groove, and semicircular tongue means carried by said second lever fitting in sliding manner into said groove in said first lever, said second lever and the tongue means being constructed of one integral piece with the side walls thereof tapered and the grain flow of the lever running longitudinally thereof and looping up into the tongue means.

4. A pivoted tool, comprising, first and second lever members, tongue and groove pivot means between said first and second lever members, and clamp means holding said lever members engaged for pivotal interconnection, said pivot means comprising a series of semicircular grooves with land areas therebetween in said first lever member, said first lever and the grooves therein being constructed of one integral piece with the grain flow of the lever running longitudinally thereof and looping down under the grooves and up into the land areas separating the grooves, and tongue means carried by said second lever fitting in sliding manner into selected grooves in said first lever.

5. A pivoted tool, comprising, first and second lever members, tongue and groove pivot means between said first and second lever members, and clamp means holding said lever members engaged for pivotal interconnection, said pivot means comprising a series of semicircular grooves with land areas therebetween in said first lever member, said first lever and the grooves therein being forged of one integral piece with the grain flow of the lever running longitudinally thereof and looping down under the grooves and up into the land areas separating the grooves, the surface of said land areas and grooves being substantially as forged with substantially no discontinuity of the grain flow structure, and tongue means carried by said second lever fitting in sliding manner into selected grooves in said first lever.

WILLIS V. DAUGHERTY.

REFERENCES CITED

The following references are of record in the file of this patent:

UNITED STATES PATENTS

| Number | Name | Date |
| --- | --- | --- |
| 2,592,927 | Manning | Apr. 15, 1952 |

FOREIGN PATENTS

| Number | Country | Date |
| --- | --- | --- |
| 99,868 | Sweden | Sept. 17, 1940 |